(12) United States Patent
Iwase et al.

(10) Patent No.: US 9,751,571 B2
(45) Date of Patent: Sep. 5, 2017

(54) DIFFERENT MATERIALS PANEL STRUCTURE

(71) Applicant: KABUSHIKI KAISHA KOBE SEIKO SHO (KOBE STEEL, LTD.), Kobe-shi (JP)

(72) Inventors: Tetsu Iwase, Fujisawa (JP); Yoshihaya Imamura, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/112,004

(22) PCT Filed: Jan. 19, 2015

(86) PCT No.: PCT/JP2015/051199
§ 371 (c)(1),
(2) Date: Jul. 15, 2016

(87) PCT Pub. No.: WO2015/118931
PCT Pub. Date: Aug. 13, 2015

(65) Prior Publication Data
US 2016/0339966 A1    Nov. 24, 2016

(30) Foreign Application Priority Data

Feb. 7, 2014   (JP) ................................ 2014-022827
Nov. 21, 2014  (JP) ................................ 2014-236158

(51) Int. Cl.
*B62D 35/00*  (2006.01)
*B62D 29/00*  (2006.01)
(Continued)

(52) U.S. Cl.
CPC ............ *B62D 29/008* (2013.01); *B21J 15/00* (2013.01); *B21J 15/025* (2013.01); *B60J 5/0469* (2013.01);
(Continued)

(58) Field of Classification Search
CPC .. B62D 29/008; B62D 25/105; B62D 27/023; B21J 15/00; B21J 15/025; B60J 5/0469;
(Continued)

(56) References Cited

U.S. PATENT DOCUMENTS 4,427,869 A   1/1984  Kimura et al.
4,738,560 A * 4/1988  Brussow ............. B23K 33/008
                                             219/86.9

(Continued)

FOREIGN PATENT DOCUMENTS

CN   101590598 A   12/2009
JP    56-80380 A    7/1981
(Continued)

OTHER PUBLICATIONS

International Search Report and Written Opinion issued Apr. 21, 2015 in PCT/JP2015/051199 filed Jan. 19, 2015.

*Primary Examiner* — Lori L Lyjak
(74) *Attorney, Agent, or Firm* — Oblon, McClelland, Maier & Neustadt, L.L.P.

(57) ABSTRACT

Provided is a different materials panel structure having reduced occurrence of displacement or warping of a joining section and having excellent external appearance of an outer panel (2). The different materials panel structure has: an outer panel comprising a first metal material; an inner panel (3) arranged on the lower surface side of the outer panel and comprising a second metal material having a higher fusion point than the first metal material; and a rivet (6) comprising the same material as the second metal material and comprising a head section and a shaft section. An outer panel comprises a hemmed section formed by folding a rim section and which supports the inner panel via an adhesive layer (9). The head section of the rivet remains on the outer panel surface. The shaft section of the rivet penetrates from the lower surface side of the hemmed section of the outer (Continued)

panel towards the inner panel. A tip of the shaft section is spot-welded to the inner panel and a protruding section (3a) is provided in the inner panel at a position corresponding to the rivet and protruding in the axial direction of the rivet. A heat insulation section (8) comprising the adhesive layer or the adhesive layer and a gap is formed between the protruding section after welding and the outer panel.

18 Claims, 12 Drawing Sheets

(51) Int. Cl.
  *B21J 15/00* (2006.01)
  *B62D 25/10* (2006.01)
  *F16B 5/04* (2006.01)
  *F16B 19/05* (2006.01)
  *B60J 5/04* (2006.01)
  *B21J 15/02* (2006.01)
  *B62D 27/02* (2006.01)

(52) U.S. Cl.
  CPC .......... *B60J 5/0483* (2013.01); *B62D 25/105* (2013.01); *B62D 27/023* (2013.01); *B62D 27/026* (2013.01); *F16B 5/04* (2013.01); *F16B 19/05* (2013.01)

(58) Field of Classification Search
  CPC .......... B60J 5/0483; B60J 27/026; F16B 5/04; F16B 19/05
  See application file for complete search history.

(56) References Cited

U.S. PATENT DOCUMENTS

| | | | |
|---|---|---|---|
| 6,528,176 B1 * | 3/2003 | Asai | B21D 39/021 29/521 |
| 6,806,436 B2 * | 10/2004 | Katou | B23K 11/11 219/86.9 |
| 9,180,548 B2 * | 11/2015 | Khakhalev | B23K 11/11 |

FOREIGN PATENT DOCUMENTS

| | | |
|---|---|---|
| JP | 61-202621 A | 9/1986 |
| JP | 7-214338 A | 8/1995 |
| JP | 2007-283313 A | 11/2007 |
| JP | 2014-580 A | 1/2014 |
| WO | 2007/063646 A1 | 6/2007 |

* cited by examiner

DIFFERENT MATERIALS PANEL STRUCTURE

TECHNICAL FIELD

The present invention relates to a different materials panel structure including two or more metallic members made of different materials. More specifically, the present invention relates to a different materials panel structure that is used in, for example, an automobile body.

BACKGROUND ART

In an automobile, in order to increase travelling performance, maneuverability, and fuel consumption, a vehicle body is required to be light in weight. Therefore, materials having low specific gravity, such as aluminum alloy, are beginning to be applied to various automobile body parts. For example, an automobile panel structure, such as a hood (bonnet), a door, or a trunk, is a hollow structure including an outer panel (outer plate) and an inner panel (inner plate). The use of aluminum alloy materials as materials of these panels is being considered.

Although, in this case, the materials of the outer panel and the inner panel may be changed to aluminum alloy plates, they are sometimes formed into a different materials panel structure in which materials having characteristics that are in accordance with the required characteristics of the panels are used in combination. More specifically, the outer panel that is required to have, for example, designability, to be light in weight, and to have collision energy absorbability may be formed from an aluminum alloy plate and the inner panel whose shape is complicated and has a large forming depth may be formed from a steel plate having excellent formability.

As a method of manufacturing a different materials panel structure by using the outer panel made of aluminum alloy and the inner panel made of steel, for example, a method of integrating the outer panel and the inner panel by hem processing (hemming or seam folding) in which peripheral edge portions of the outer panel are folded back and are caused to sandwich peripheral edge portions of flanges of the inner panel exists. In this method, ordinarily, an adhesive layer (resin layer) that is also an insulating layer for preventing electrolytic corrosion is formed between the outer panel and the inner panel by using a thermosetting resin, such as an epoxy resin, a polyester resin, or a phenol resin.

After the above-described different materials panel structure is assembled on an automobile body and subjected to coating, baking is performed at a high temperature in the range of 170 to 200° C. Here, due to displacement of a hem section caused by a difference between the linear expansion coefficient of the outer panel made of an aluminum alloy and the linear expansion coefficient of the inner panel made of steel, thermal deformation in which warping occurs at a side of the outer panel made of an aluminum alloy may occur. As a method of preventing such a thermal deformation, a method of, when integrating the inner panel and the outer panel with each other by hem processing, partly performing a TIG welding and joining operation on a predetermined location of each corner of the panel structure by using a flux cored wire (FCW) is proposed (refer to Patent Literature 1).

The method described in Patent Literature 1 above is very effective for preventing the hem section from being displaced if the welded joint can be provided with sufficient strength.

However, when joining different, materials, such as steel and aluminum, in other welding methods in addition to TIG welding, that is, MIG welding, laser welding, and spot welding, a fragile intermetallic compound (such as $Al_2Fe_5$, which is an aluminum-iron intermetallic compound) is formed in a joining interface of a welded portion, as a result of which a sufficient joining strength may not be obtained.

As a welding method that does not cause such an intermetallic compound to be formed, a method in which spot welding using a rivet made of the same type of material as one of the materials is performed is proposed (refer to Patent Literature 2).

CITATION LIST

Patent Literature

PTL 1 Japanese Unexamined Patent Application Publication No. 2013-184198

PTL 2: Japanese Unexamined Patent Application Publication No. 2010-207898

SUMMARY OF INVENTION

Technical Problem

In the method of manufacturing a different materials panel structure described in Patent Literature 1 above, for example, spot welding using FCW (flux cored wire) is used as the welding method. However, in this method, since heat input is large, surrounding portions of the joint tend to be affected by welding heat.

When a rivet described in Patent Literature 2 is used to join an outer panel made of an aluminum alloy and an inner panel made of steel to each other, since the rivet and the inner panel are both made of steel, a fragile intermetallic compound, such as $Al_2Fe_5$, is not formed in the joint.

However, when this method is applied to a hem of the outer panel made of an aluminum alloy, the heat of a melted portion of an end of the rivet generated by the spot welding is transferred to the aluminum material, and a bulging portion is formed in the outer panel. As a result, the appearance of a panel product may be considerably spoiled.

Since the appearance of an automobile body member is important, a joining method that, in addition to providing joining strength, does not cause the appearance of the outer panel to deteriorate is required.

Accordingly, it is an object of the present invention to provide a different materials panel structure that can reduce the occurrence of displacement between an outer panel and an inner panel at a hemmed section and the occurrence of panel warping, and whose outer panel has excellent appearance.

Solution to Problem

A different materials panel structure includes an outer panel that is made of a first metallic material; an inner panel that is disposed at a lower surface side of the outer panel and that is made of a second metallic material having a melting point that is higher than that of the first metallic material; and a rivet that is made of the same type of material as the second metallic material and that includes a head section and a shaft section, wherein the outer panel includes a hemmed section that is formed by bending a peripheral edge portion of the outer panel and that holds the inner panel via an adhesive layer, wherein, with the head section of the rivet remaining on a surface of the outer panel, the shaft section of the rivet penetrates towards the inner panel from a lower surface side of the hemmed section of the outer panel, and an end of the shaft section is spot-welded to the inner panel, wherein the inner panel includes a protruding section at a location thereof that faces the rivet, the protruding section extending in an axial direction of the rivet, and wherein a heat insulation section including the adhesive layer or the adhesive layer and a gap is formed between the outer panel and the protruding section of the inner panel after welding.

At least one of the head section and the shaft section of the rivet may be caulked to the outer panel.

In this case, a portion of the rivet that contacts the outer panel may include a film having a resistivity that is higher than that of the inner panel.

The different materials panel structure according to the present invention may include an adhesive layer between the outer panel and the inner panel.

The rivet may be joined to, for example, a corner of the inner panel.

The different materials panel structure may be such that, for example, the first metallic material is aluminum or an aluminum alloy, and the second metallic material is iron or an iron alloy.

Advantageous Effects of Invention

According to the present invention, since, while reducing the occurrence of displacement between the outer panel and the inner panel at the hemmed section and the occurrence of panel warping, the formation of the bulging portion in the outer panel can also be reduced, a different materials panel structure having excellent appearance can be provided.

DESCRIPTION OF EMBODIMENTS

An embodiment according to the present invention is described in detail below with reference to the attached drawings. The present invention is not limited to the embodiment that is described below.

[Mechanism of Thermal Deformation of Different Materials Panel Structure]

Figure 1A:
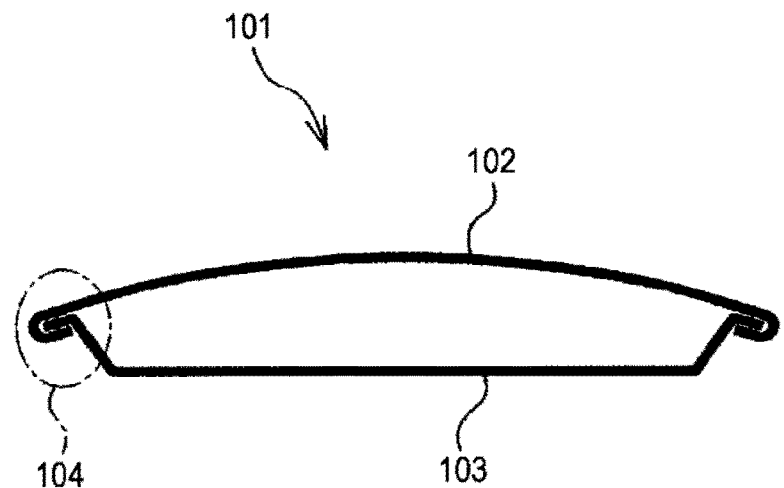
FIG. 1A is a schematic view of a deformation process of a different materials panel structure caused by thermal expansion and contraction when bake-coating panels.
Figure 1A:
Figure 1A:
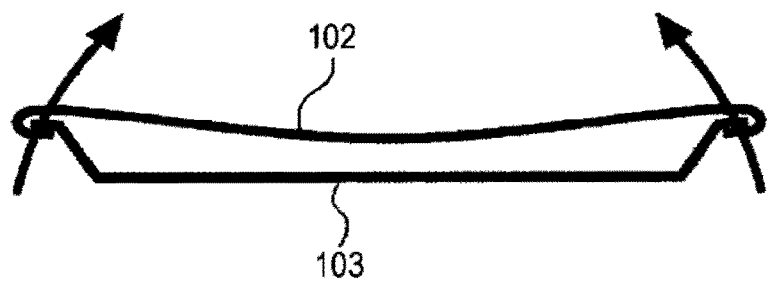
Figure 1B:
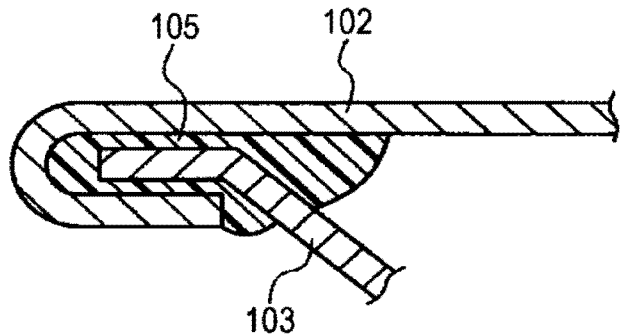
FIG. 1B is an enlarged sectional view of a hemmed section in FIG. 1A.
Figure 1B:
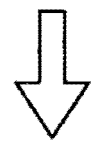
Figure 1B:
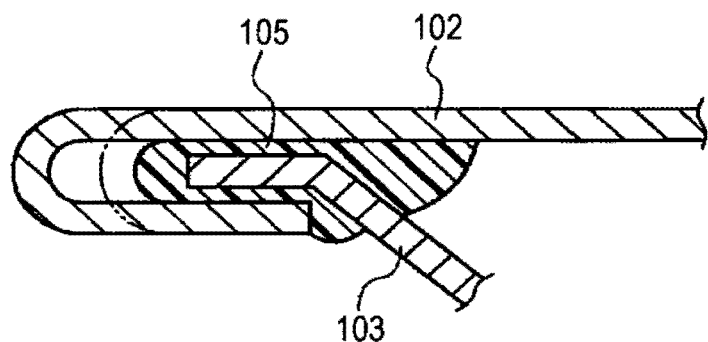
Figure 1B:
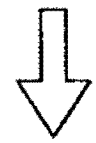
Figure 1B:
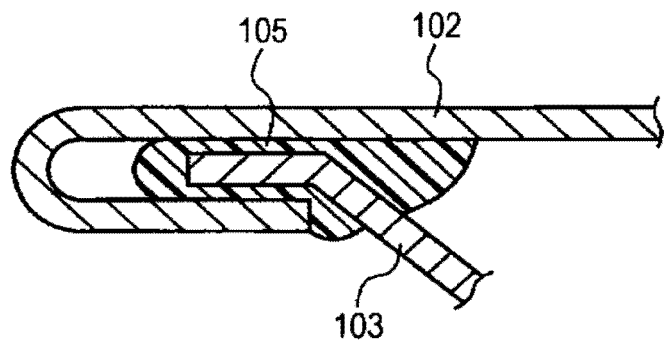

FIGS. 1A and 1B are schematic views of a deformation process of a different materials panel structure 101 caused by thermal expansion and contraction when bake-coating panels. FIG. 1A is a schematic view of the entire different materials panel structure 101, and FIG. 1B is an enlarged sectional view of a hemmed section 104 thereof. In the different materials panel structure 101 shown in FIG. 1A, an outer panel 102 is formed from an aluminum alloy plate, and an inner panel 103 is formed from a steel plate.

That is, the linear expansion coefficient of the outer panel 102 is greater than the linear expansion coefficient of the inner panel 103.

The inner panel 103 is disposed at a lower-surface side of the outer panel 102.

Therefore, as shown in FIG. 1B, displacement deformation in which, due to heating during baking, a bent portion of the outer panel 102 is considerably displaced in an outer side direction of the panel by thermal expansion, is displaced from a position where it has been holding the inner panel 103 from both sides, and protrudes therefrom occurs, that is, a so-called "hem displacement" occurs. On the other hand, since an adhesive layer 105 applied to a location between the outer panel 102 and the inner panel 103 starts to undergo thermosetting due to the heating during the baking, the hemmed section 104 in a largely displaced state adheres and is secured to the inner panel 103.

After the bake-coating ends, the outer panel 102 contracts. This phenomenon corresponds to a change in the linear length of the outer panel 102. This causes the outer panel 102 of the different materials panel structure 101 shown in FIG. 1A to warp upward. When such a warping occurs in the outer panel 102, the entire different materials panel structure 101 or corners of the different materials panel structure 101 are deformed. Therefore, it is difficult to form an automobile panel having high form accuracy.

[Entire Structure]

Figure 2A:
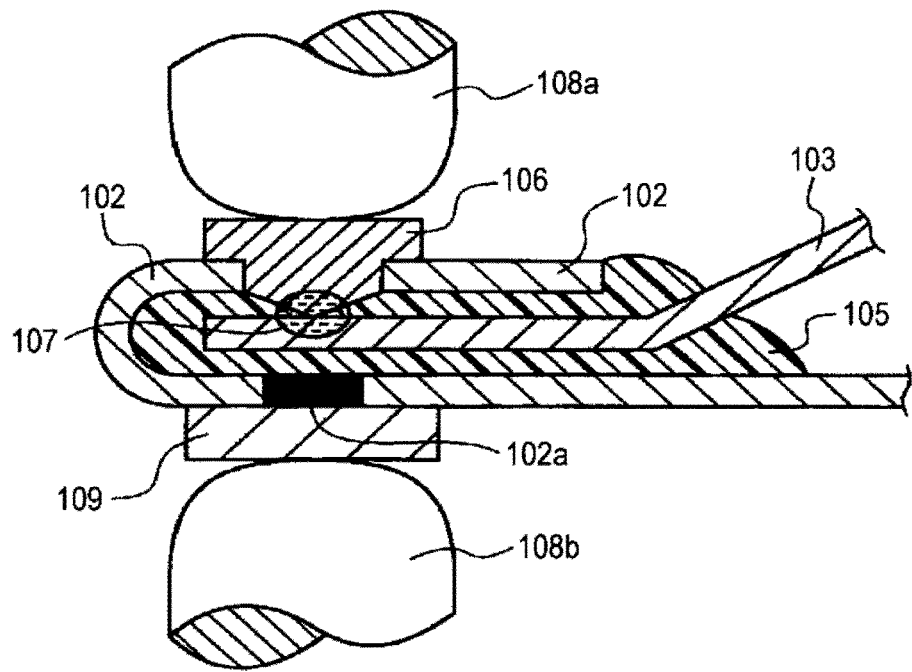
FIG. 2A is a schematic view of an example in which an existing spot welding method using a rivet is used to join panels.

Therefore, for the purpose of reducing the deformation of the hemmed section, the inventor decided to use a spot welding method using a rivet that can provide high joining strength without formation of a fragile intermetallic compound in order to prevent the hem displacement between the outer panel and the inner panel at the hemmed section from occurring. FIG. 2A is a schematic view of a structure when the different materials panel structure using a rivet 106 is subjected to spot welding.

Figure 2B:
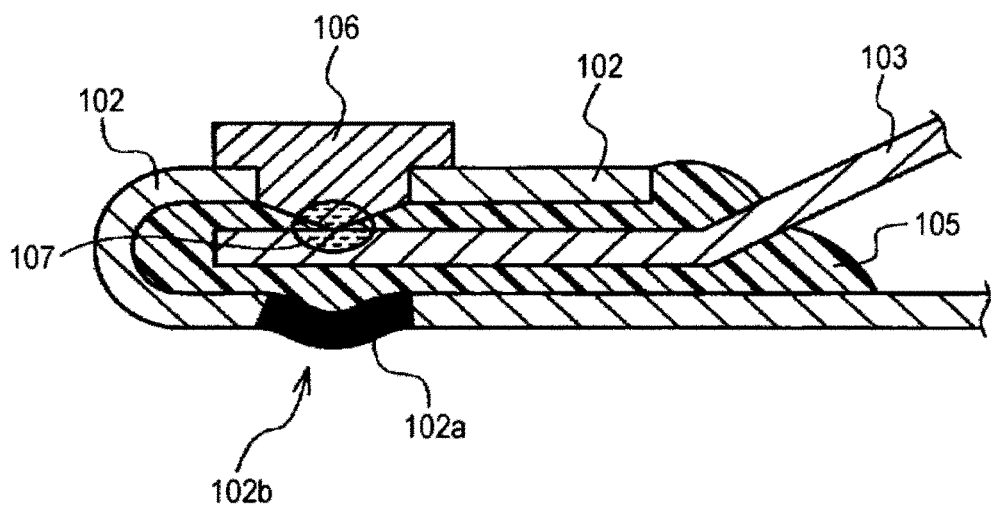
FIG. 2B is a schematic sectional view of a bulging portion that is formed in an outer panel during the spot welding.

However, as shown in FIG. 2A, when the outer panel 102 and the inner panel 103 are joined at the hemmed section by the spot welding using the rivet 106, heat of a melted portion 107 is transferred to the outer panel 102 at the opposite side, as a result of which the outer panel 102 is partly softened. In this method, even if the welding is performed with a plate-like intermediate electrode 109 interposed among welding electrodes 108a and 108b and the outer panel 102, as shown in FIG. 2B, a thermally softened portion 102a of the outer panel 102 may bulge in the form of a protrusion towards an outer side. This deteriorates the appearance of the outer panel 102, thereby making it necessary to, for example, scrape a bulged portion 102b into a flat portion after the welding.

Therefore, in a different materials panel structure according to the embodiment, in order to reduce the effects of the heat on the outer panel during the welding and joining operation, a portion to which the rivet is joined is provided with a heat insulation section, which includes an adhesive layer or an adhesive layer and a gap, between the inner panel and the outer panel in order to prevent the welding heat from being transferred to the outer panel. More specifically, the different materials panel structure according to the embodiment includes an outer panel that is made of a first metallic material and that includes bent portions formed by bending peripheral edge portions by a bending operation, an inner panel that is made of a second metallic material differing from the first metallic material and whose end portions are sandwiched by the bent portions of the outer panel, and a head section and a shaft section that are made of the same type of metallic material as the inner panel. The different materials panel structure also includes one or more rivets whose shaft section penetrates the outer panel at end portions of the bent portions and whose end is welded and joined to the inner panel. A hollow protruding section (also called a hollow convex section) is formed on a portion of the inner panel that is joined to the rivet. By using the protruding section, the heat insulation section that includes the adhesive layer or the adhesive layer and the gap is formed between the inner panel (portion thereof to which the rivet is welded) and the outer panel.

Figure 3:
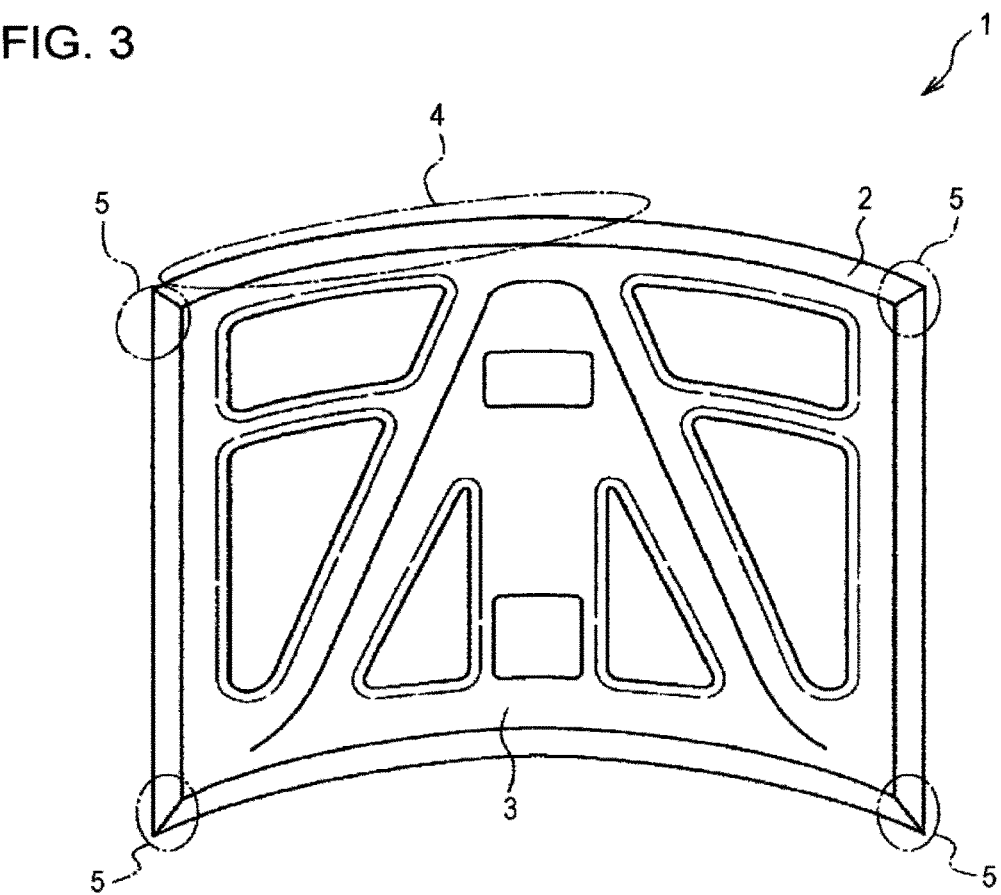
FIG. 3 is a bottom view of an engine hood, which is an exemplary different materials panel structure.
Figure 4:
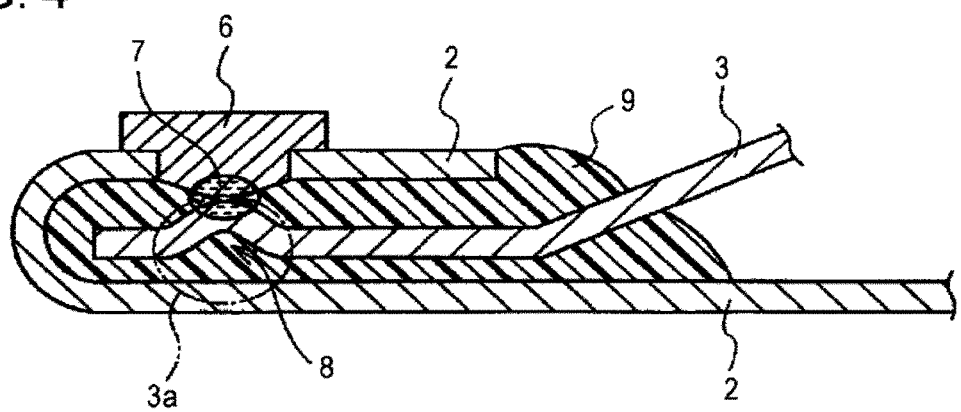
FIG. 4 is a sectional view of a hemmed section of a different materials panel structure according to an embodiment.
Figure 5A:
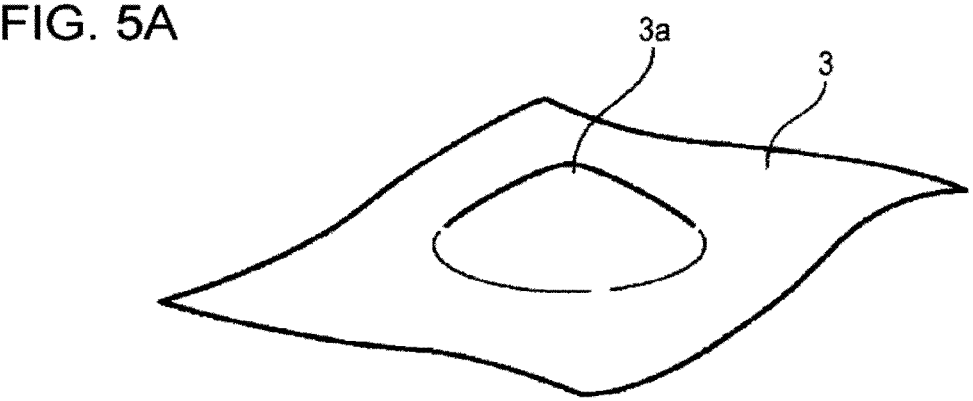
FIG. 5A is a schematic perspective view of an exemplary shape of a protruding section or a convex section of an inner panel.
Figure 5B:
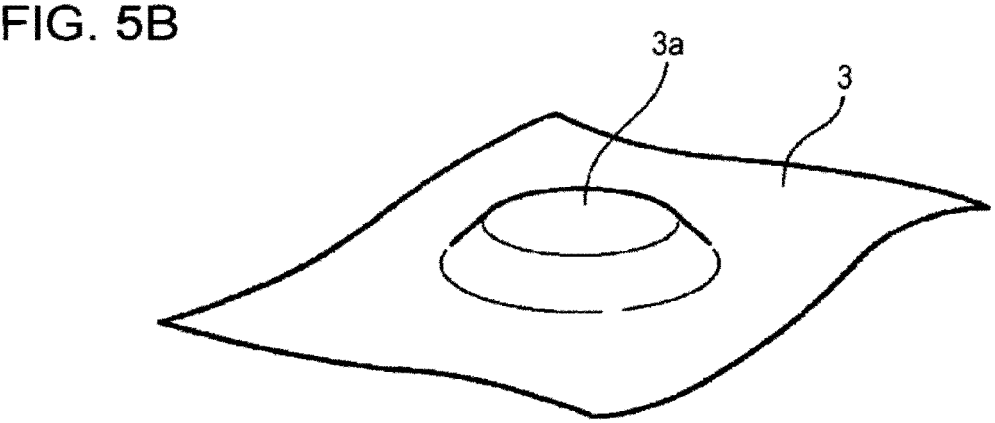
FIG. 5B is a schematic perspective view of an exemplary shape of the protruding section or the convex section of the inner panel.
Figure 5C:
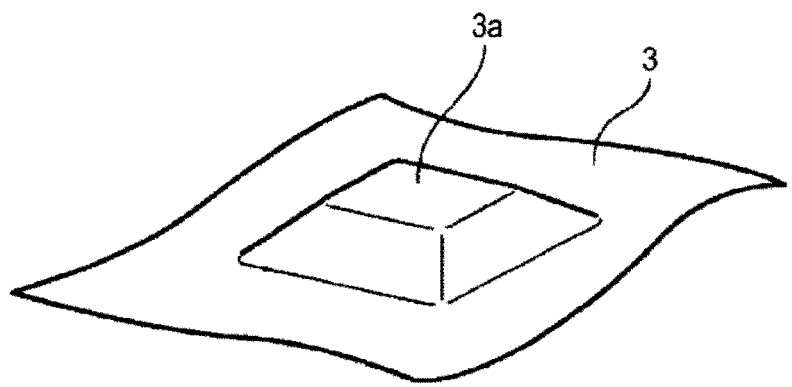
FIG. 5C is a schematic perspective view of an exemplary shape of the protruding section or the convex section of the inner panel.
Figure 5D:
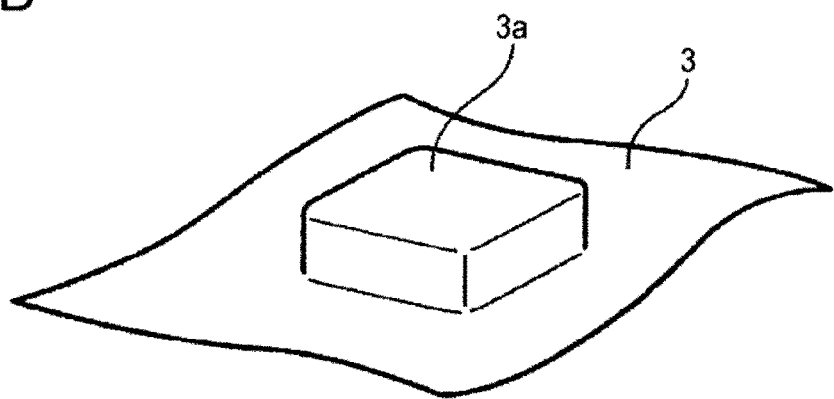
FIG. 5D is a schematic perspective view of an exemplary shape of the protruding section or the convex portion of the inner panel.
Figure 5E:
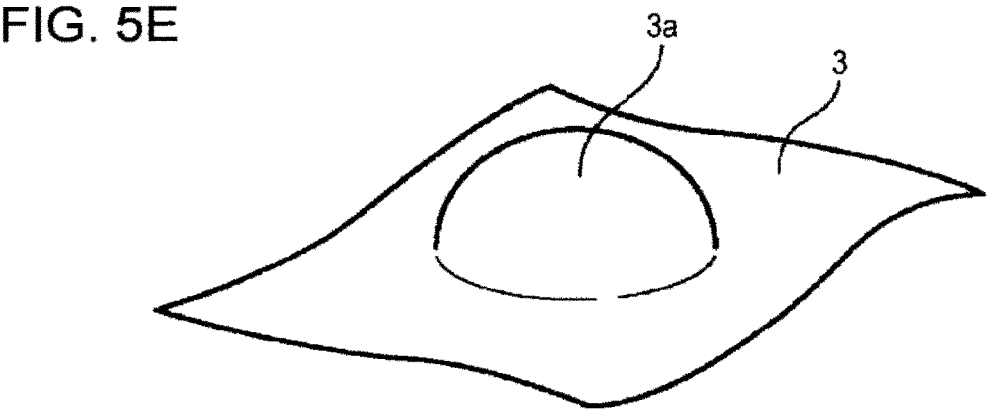
FIG. 5E is a schematic perspective view of an exemplary shape of the protruding section or the convex portion of the inner panel.
Figure 5F:
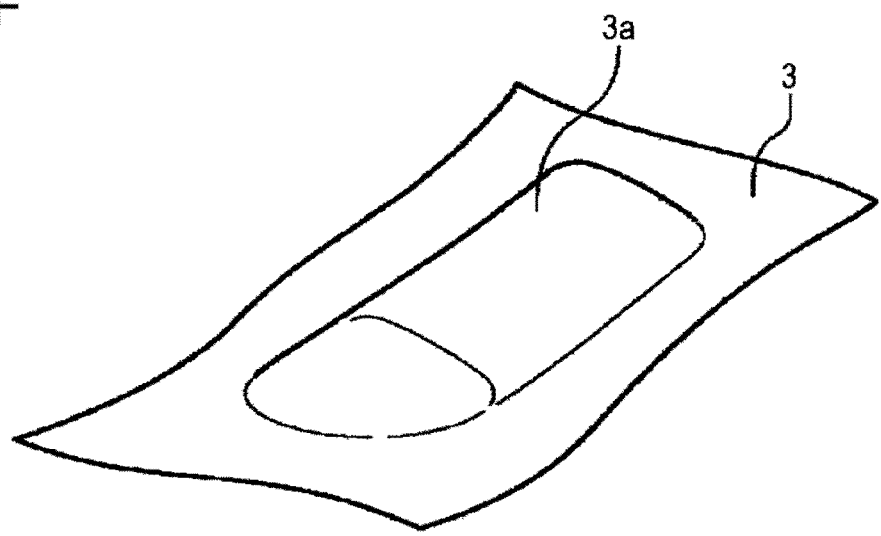
FIG. 5F is a schematic perspective view of an exemplary shape of the protruding section of the inner panel.
Figure 5G:
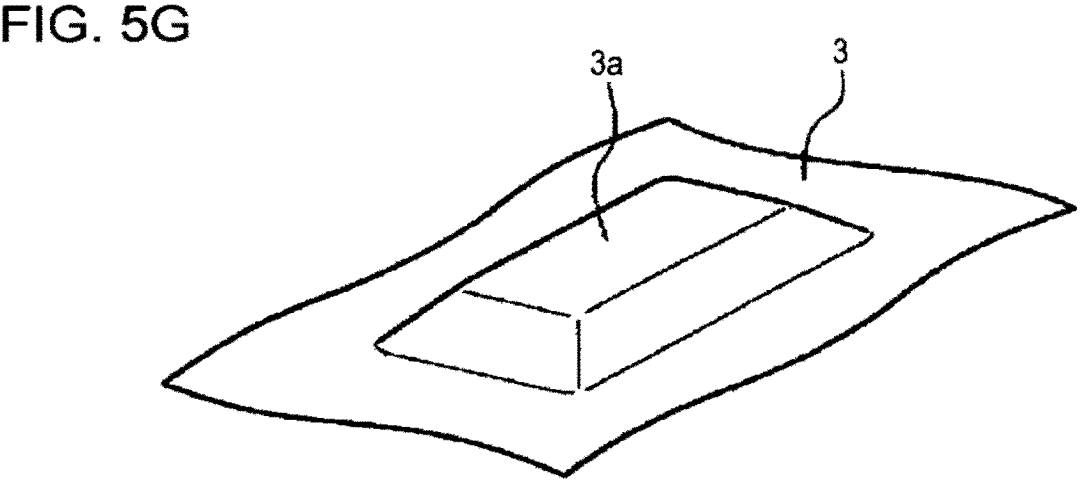
FIG. 5G is a schematic perspective view of an exemplary shape of the protruding section of the inner panel.

FIG. 3 is a bottom view of an engine hood, which is an exemplary different materials panel structure 1. FIG. 4 is a sectional view of a hemmed section 4 of the different materials panel structure 1 according to the embodiment. As shown in FIG. 3, in the different materials panel structure 1 according to the embodiment, the hemmed section 4 is formed by bending peripheral edge portions of an outer panel 2, and sandwiching end portions of an inner panel 3 by the bent portions. In addition to being applicable to the hood (bonnet) shown in FIG. 3, the different materials panel structure 1 according to the embodiment is applicable to various other types of members for an automobile body, such as a trunk and a door panel. Naturally, the solid shape, the planar shape, and a hem processing range differ according to the application of these panels.

[Outer Panel 2]

The outer panel 2 is a flat-plate-like member that is curved in a three-dimensional arc shape in its entirety towards an outer side of a vehicle body. The outer panel 2 is formed by forming, for example, an aluminum plate or an aluminum alloy plate into a predetermined shape by using various forming methods, such as press forming.

The aluminum alloy used in the outer panel 2 may be selected as appropriate in accordance with required characteristics of a vehicle body structure that is used, such as strength, formability, and corrosion resistance. As the aluminum alloy for the outer panel 2, for example, aluminum alloys, such as 3000 series, 5000 series, 6000 series, and 7000 series aluminum alloys, in conformity with JIS and AA Standard may be used. In order to reduce the weight of a vehicle body of, for example, an automobile, from the viewpoint of reducing wall thickness, it is desirable to use an aluminum alloy having high strength and excellent formability.

More specifically, it is desirable to use Si-excess-type 6000 series aluminum alloys having a silicon-magnesium ratio (=Si/Mg) of one or greater in the composition and containing an excessive amount of Si with respect to Mg, such as 6N01, 6016, 6111, and 6022. When the outer panel 2 is formed, such 6000 series aluminum alloy plates ensure formability by reduced strength (yield strength). The 6000 series aluminum alloy plates have a characteristic (bake hardening characteristic or BH characteristic) in which the strength (yield strength) is increased, when the 6000 series aluminum alloy plates undergo age-hardening due to an artificial aging treatment for a short time of 10 to 50 minutes at a low temperature of 150 to 180° C. in a subsequent baking operation.

After cold rolling and hot extrusion, the aforementioned aluminum alloy material is, for example, subjected to solution treatment and hardening (temper designation T4) and subsequent aging treatment (temper symbol T6, etc.), and overaging treatment (temper symbol T7), so that a press forming material of the outer panel 2 is formed.

In view of the required characteristics as the outer panel 2, such as weight reduction, strength, rigidity, and formability of the automobile body, the thickness (plate thickness) of the aluminum alloy plate for the outer panel 2 is generally selected from thicknesses in the range of 0.5 to 3 mm as appropriate. Here, if the aluminum alloy plate is too thin, the required strength and rigidity as an automobile member may not be ensured. On the other hand, if the aluminum alloy plate is too thick, the weight of the automobile body cannot be reduced, as a result of which hem processing becomes difficult to perform.

[Inner Panel 3]

The inner panel 3 is a member that has the shape of a hat in cross section (that is, its cross-sectional shape is a cross-sectional HAT shape). The inner panel 3 is formed by forming, for example, an iron plate or an iron alloy plate, such as a steel plate, into a predetermined shape by using various forming methods, such as press forming. As shown in FIG. 4, the inner panel 3 includes a hollow protruding section 3a on at least a portion of the inner panel 3 to which a rivet 6 is joined. The melting point of the inner panel 3 is higher than the melting point of the outer panel 2.

FIGS. 5A to 5G are each a schematic perspective view of an exemplary shape of the protruding section 3a of the inner panel 3. The external shape of the protruding section 3a of the inner panel 3 is not particularly limited to certain external shapes as long as it is a hollow protruding section. The protruding section 3a may have various shapes, such as a conical shape shown in FIG. 5A, a circular truncated conical shape shown in FIG. 5B, a frustum shape shown in FIG. 5C, a rectangular column shape shown in FIG. 5D, a dome shape shown in FIG. 5E, and a bead shape shown in FIG. 5F.

The height of the protruding section 3a is also not particularly limited to certain heights, and may be selected as appropriate according to an application member. However, the height is desirably in the range of 0.1 to 2.0 mm, and more desirably in the range of 0.3 to 1.5 mm. When the height of the protruding section 3a is set in this range, as shown in FIG. 4, a heat insulation section 8 that includes an adhesive layer or an adhesive layer and a gap is formed between the protruding section 3a and the outer panel 2, and heat of a melted portion 7 that is produced during welding and joining operations can be prevented from being transferred to the outer panel 2. In addition, when they are joined to each other by spot welding, it is possible to prevent pressing forces by the electrodes from being applied to the outer panel 2.

A surface of the steel plate that is used in the inner panel 3 may be covered with a widely used zinc-based or aluminum-based covering layer by, for example, plating; or may be a bare plate. Similarly to existing steel inner panels, the steel material that is used in the different materials panel structure according to the embodiment may be an inexpensive soft steel plate. However, it is possible to use a cold rolled steel plate, such as a high tensile strength steel plate or a stainless steel plate.

In view of the required characteristics as the inner panel 3, such as weight reduction, strength, rigidity, and formability of the automobile body, the thickness (plate thickness) of the steel plate is selected from thicknesses in the range of 0.3 to 3 mm as appropriate. Here, if the steel plate is too thin, the required strength and rigidity as an automobile member may not be ensured. On the other hand, if the steel plate is too thick, it becomes difficult to reduce the weight of the automobile body.

[Hemmed Section 4]

As shown in FIG. 4, the hemmed section 4 is formed by hem bending (bending) the peripheral edge portions of the outer panel 2. The hemmed section 4 joins the outer panel 2 to the inner panel 3 via an adhesive layer 9. The adhesive layer 9 is described later.

[Rivet 6]

Figure 6A:
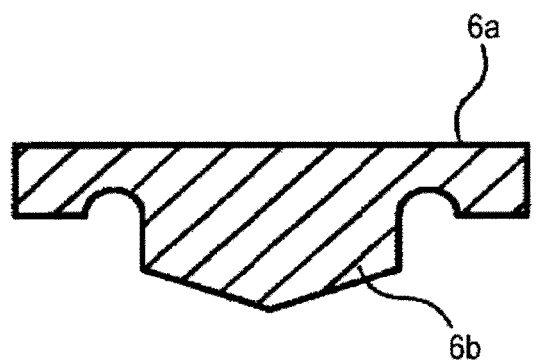
FIG. 6A is a sectional view of a rivet in an axial direction thereof, showing an exemplary structure of the rivet.
Figure 6B:
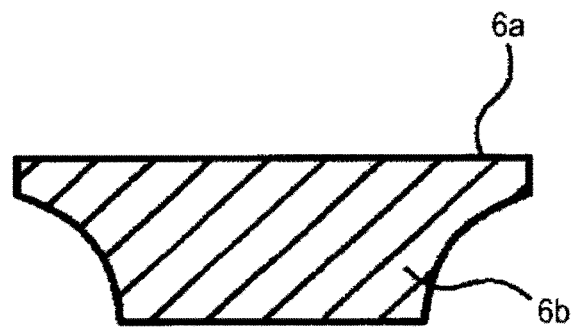
FIG. 6B is a sectional view of a rivet in an axial direction thereof, showing an exemplary structure of the rivet.
Figure 6C:
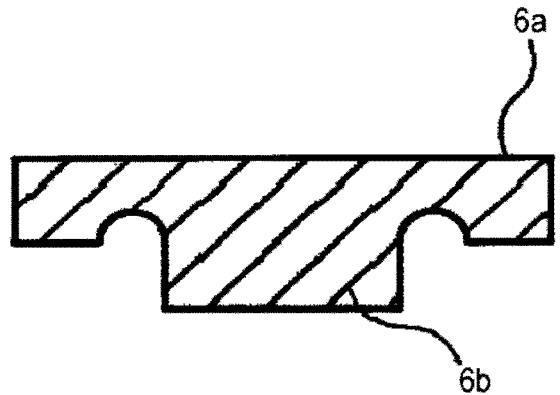
FIG. 6C is a sectional view of a rivet in an axial direction thereof, showing an exemplary structure of the rivet.
Figure 6D:
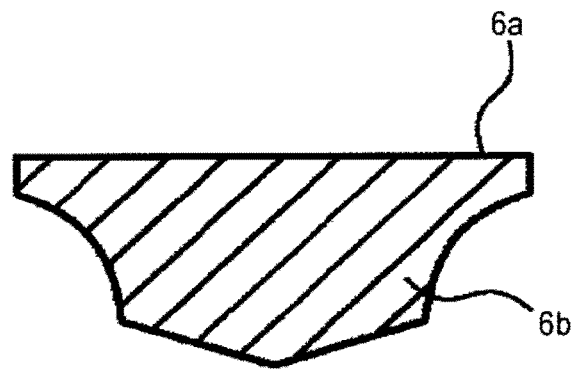
FIG. 6D is a sectional view of a rivet in an axial direction thereof, showing an exemplary structure of the rivet.
Figure 7A:
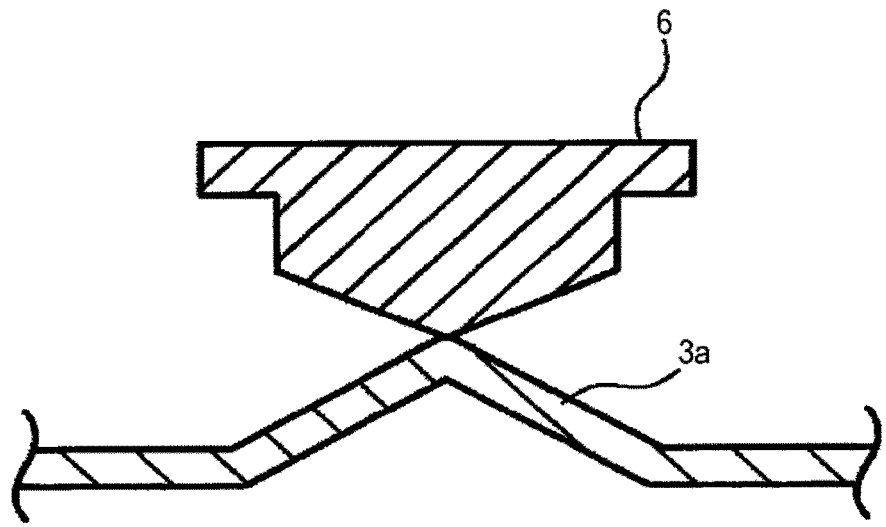
FIG. 7A is a schematic sectional view of a combination of the protruding section of the inner panel and a rivet.
Figure 7B:
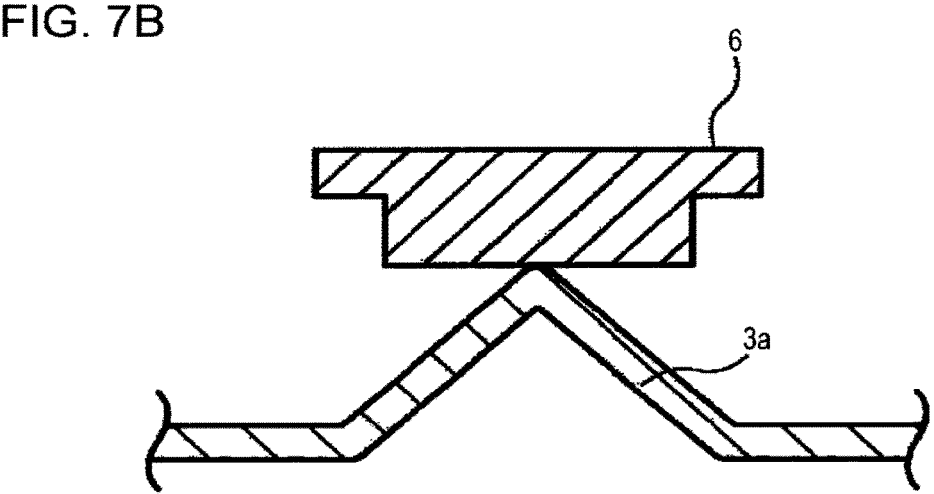
FIG. 7B is a schematic sectional view of a combination of the protruding section of the inner panel and a rivet.
Figure 7C:
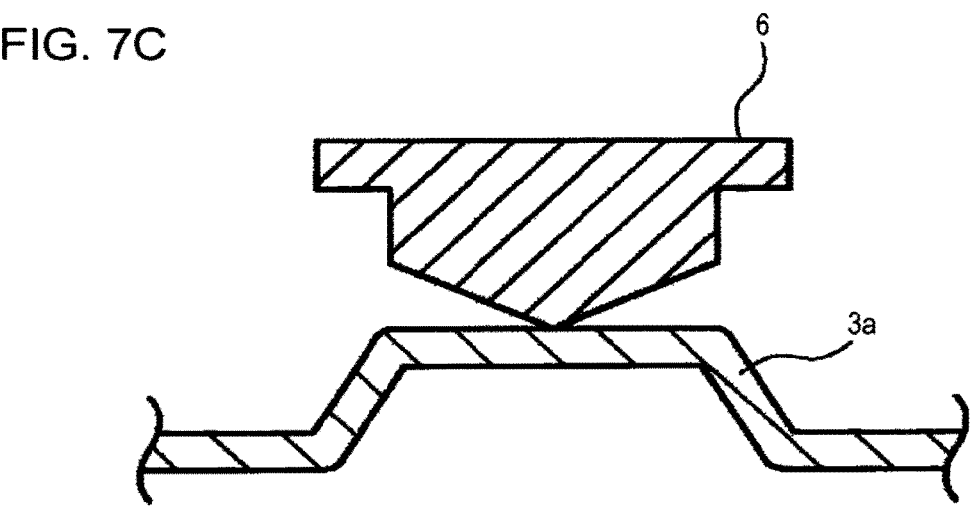
FIG. 7C is a schematic sectional view of a combination of the protruding section of the inner panel and a rivet.
Figure 7D:
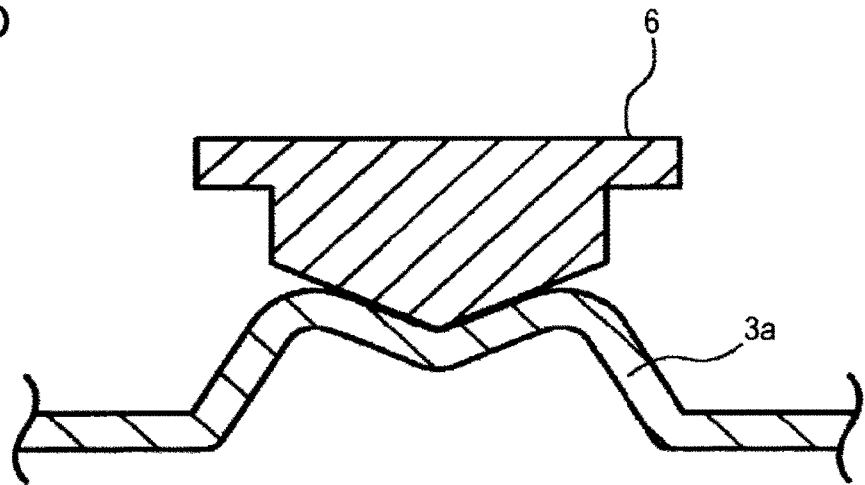
FIG. 7D is a schematic sectional view of a combination of the protruding section of the inner panel and a rivet.
Figure 8A:
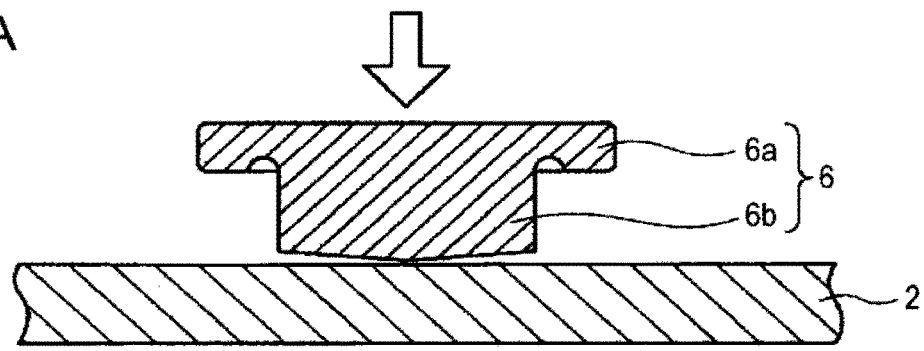
FIG. 8A is a schematic sectional view showing a rivet mounting method in terms of the order of steps.
Figure 8B:
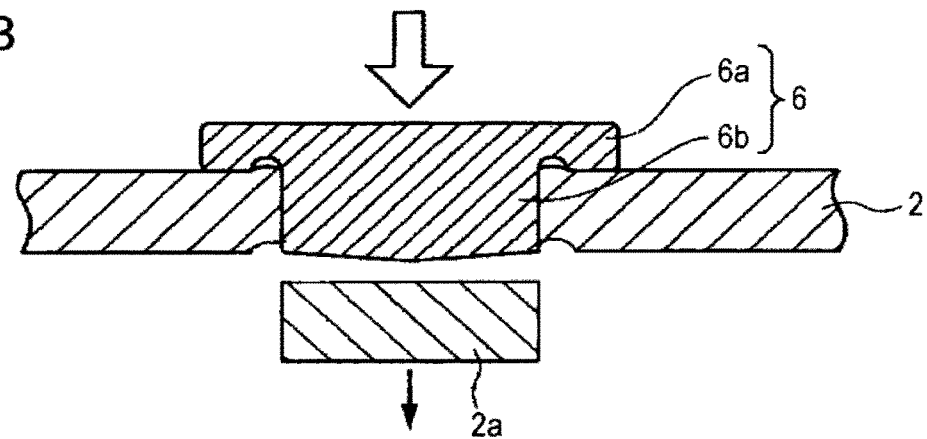
FIG. 8B is a schematic sectional view showing the rivet mounting method in terms of the order of steps.
Figure 9A:
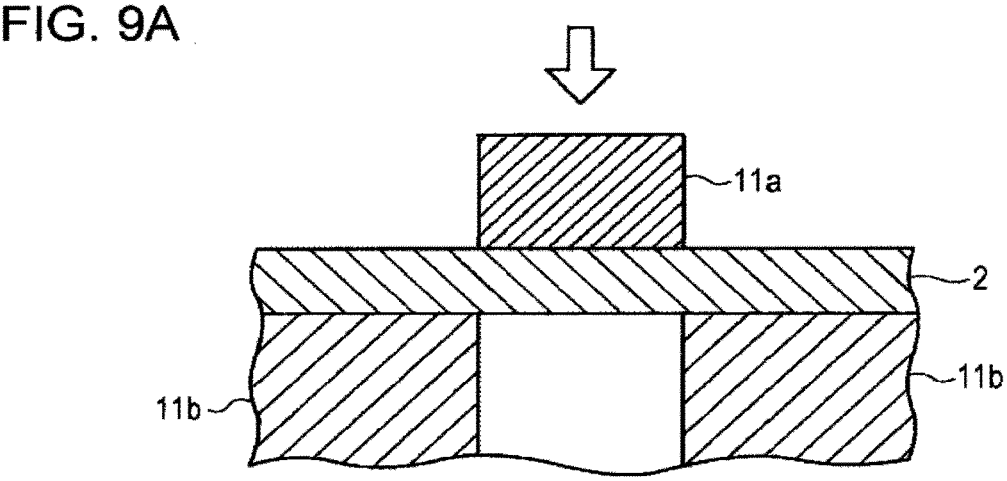
FIG. 9A is a schematic sectional view showing a different rivet mounting method in terms of the order of steps.
Figure 9B:
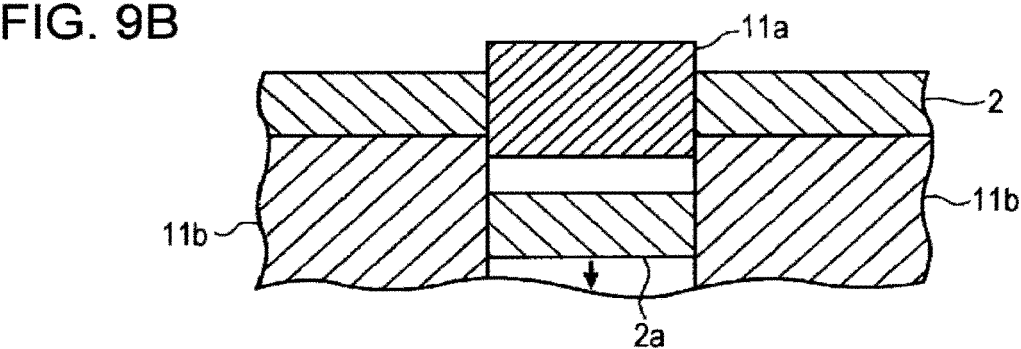
FIG. 9B is a schematic sectional view showing the different rivet mounting method in terms of the order of steps.
Figure 9C:
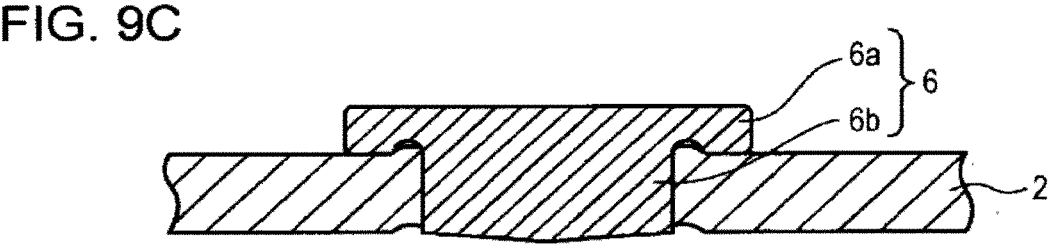
FIG. 9C is a schematic sectional view showing the different rivet mounting method in terms of the order of steps.

FIGS. 6A to 6D are each a sectional view of an exemplary rivet structure. FIGS. 7A to 7D are each a schematic sectional view of a combination of the protruding section 3a of the inner panel and the rivet 6. FIGS. 8A and 8B are schematic sectional views showing a rivet-6 mounting method in terms of the order of steps, and FIGS. 9A, 9B, and 9C are schematic sectional views showing a different rivet-6 mounting method in terms of the order of steps. As shown in FIGS. 6A to 6D, the rivet 6 includes a head section 6a and a shaft section 6b. The shape of the rivet 6 is not particularly limited to certain shapes, so that the rivet 6 may have a shape whose end has a conical shape as shown in FIGS. 6A and 6D, or whose end is flat as shown in FIGS. 6B and 6C. The shape and size of the head section 6a and the shaft section 6b may be selected as appropriate according to use and method.

Further, the combination of the rivet 6 and the protruding section 3a of the inner panel 3 is also not particularly limited to certain combinations. For example, when the protruding section 3a has a conical shape or a pyramidal shape, it is possible to use the rivet 6 whose end has either a conical shape or a flat shape as shown in FIGS. 7A and 7B. Although, when the protruding section 3a has a circular truncated conical shape or a frustum shape, the rivet 6 whose end has a conical shape may be brought into contact with and welded to the protruding section 3a as shown in FIG. 7C, the rivet 6 may be welded with an end of the rivet 6 being pushed into the protruding section 3a as shown in FIG. 7D.

The rivet 6 that is used is one that is made of the same type of metallic material as the inner panel 3. Therefore, a fragile intermetallic compound is not formed at a joint, so that the joining strength can be kept high. When the joining strength between the rivet 6 and the inner panel 3 is low, hem displacement can no longer be sufficiently prevented. For example, when the inner panel 3 is made of a steel material, by also forming the rivet 6 out of a steel material, such as soft steel, it is possible to perform spot welding by using an existing steel material spot welding line.

Further, when the welding and joining operations are performed by the spot welding, it is desirable that a portion of the rivet 6 that contacts the outer panel 2 be provided with a film made of a material having a resistivity that is higher than that of the material of the inner panel 3, such as a steel material. By providing such a film having high resistivity, welding current that flows during the spot welding branches at the outer panel 2, as a result of which it is possible to prevent a reduction in electric current at the welded portion.

Specific examples of the high-resistance film that is provided on the rivet 6 include a film made of a metal having a relatively high resistivity, such as zinc, lead, or aluminum; a film made of a synthetic resin, such as a polyester resin or a silicone resin, a film made of an oxide of iron (mill scale), and an electroless Ni—P plated film. The high-resistance film that is provided on the rivet 6 may be an insulating film that is formed by using a commercially available surface treatment agent, such as DISGO (registered trademark), GEOMET (registered trademark), or LAFRE (registered trademark).

Further, it is desirable that the head section 6a and/or the shaft section 6b of the rivet 6 be caulked to the outer panel 2. By caulking the rivet 6 to the outer panel 2, before welding, the rivet 6 is no longer removed during transport until a welding step. Therefore, after the welding, it is possible to maintain the minimum joining strength with respect to the outer panel 2 even if the adhesive layer 9 deteriorates with time.

For example, as shown in FIGS. 8A and 8B, the caulking may be performed by driving the rivet 6 into the outer panel 2 and causing the member to be fastened (the outer panel 2) to undergo plastic flow to the head section 6a. Alternatively, the caulking may be performed by, with a preparation hole formed in the member to be fastened (the outer panel 2) in advance, causing the member to be fastened (the outer panel 2) to undergo plastic flow and to be caulked to the head section 6a of the rivet 6. As shown in FIGS. 9A to 9C, the preparation hole is formed by punching out a portion 2a of the outer panel 2 with punching jigs 11a and 11b. Thereafter, the rivet 6 including the shaft section 6b having a diameter that is smaller than that of the preparation hole is inserted into the preparation hole, and upsetting is performed on the rivet 6 in an axial direction to thicken the shaft section 6*b*, so that the rivet 6 can be caulked to the outer panel 2.

[Adhesive Layer 9]

As shown in FIG. 4, the different materials panel structure 1 according to the embodiment includes the adhesive layer 9 between the outer panel 2 and the inner panel 3. When the peripheral edge portions of the outer panel 2 are folded back, the peripheral edge portions of the outer panel 2 sandwich the peripheral edge portions of flanges of the inner panel 3 via the adhesive layer 9, so that they are integrated with each other. Therefore, the hemmed section 4 having a layered structure in which the peripheral edge portions of the outer panel 2 and the peripheral edge portions of the flanges of the inner panel 3 are combined with each other via the adhesive layer 9 is formed, so that they are integrated with each other as the different materials panel structure 1.

In forming the adhesive layer 9, when hem processing (hemming, in particular, flat hem processing) is performed, it is possible to, prior to folding back the peripheral edge portions of the outer panel 2 and sandwiching the peripheral edge portions of the flanges of the inner panel 3, apply a thermosetting resin adhesive to inner regions of the peripheral edge portions of the outer panel 2 opposing the peripheral edge portions of the flanges of the inner panel 3. Here, the thermosetting resin adhesive can prevent electrolytic corrosion that occurs when different materials, that is, aluminum and iron, directly contact each other, and can increase the joining strength between the different materials (different materials panel structure). Therefore, it is desirable that the adhesive be applied around (so as to surround) the entire peripheral edge portions of the outer panel 2.

A thermoplastic resin adhesive that forms the adhesive layer 9 only needs to be an adhesive that hardens when baking and hardening the automobile body panels, and that can exhibit the required adhesive strength as the different materials panel structure. Examples of the thermoplastic resin adhesive that forms the adhesive layer 9 include an epoxy resin adhesive, a polyester resin adhesive, and a phenol resin adhesive.

[Welding Method]

The rivet 6 and the inner panel 3 are joined to each other by welding. In a composite structure, such as the different materials panel structure 1, when performing baking and hardening, the difference between the linear expansion coefficient of aluminum and the linear expansion coefficient of steel causes problems including hem displacement of the outer panel 2 made of an aluminum alloy, and thermal deformation of the constrained outer panel 2 caused by the hem displacement to occur. For suppressing the thermal deformation of the outer panel 2, it is effective to prevent the hem displacement of the outer panel 2. For example, movement caused by thermal expansion and contraction of the panel materials can be restricted by spot-welding predetermined locations, such as corners 5, and securing the outer panel 2 and the inner panel 3 to each other (see FIG. 3).

Here, an end of the shaft section 6*b* of the rivet 6 and the inner panel 3 are welded to each other by resistance spot welding. Even if the adhesive layer 9 exists between the inner panel 3 and the outer panel 2, the resistance spot welding can be performed while removing the adhesive layer 9 at a joint by pressing the electrodes. Therefore, the resistance spot welding is suitable from the viewpoint of joining strength.

In order to ensure surface smoothness of the outer panel 2, it is desirable to perform spot welding while contacting a plate against the outer panel 2. In this case, it is desirable that the plate used be a block member or a panel that is made of a material having high thermal conductivity, such as a steel plate, or having a flow path that allows a coolant to flow therethrough.

When welding and joining the rivet 6 and the inner panel 3 to each other, the melted portion 7 having a high temperature is formed. In the different materials panel structure 1 according to the embodiment, the protruding section 3*a* is formed at a joint of the inner panel 3. Therefore, the heat insulation section 8 that includes the adhesive layer or the adhesive layer and the gap is formed at a back surface of the protruding section 3*a* so as to be disposed between the protruding section 3*a* and the outer panel 2. Further, since the protruding section 3*a* is hollow, the heat insulation section 8 that includes the adhesive layer or the adhesive layer and the gap is thickly formed. This blocks or considerably reduces heat transfer to the outer panel 2. As a result, the softening of the outer panel 2 is reduced, so that bulging of the outer panel 2 that occurs when an end of the rivet is pushed can be suppressed.

In the different materials panel structure 1 according to the embodiment, since the inner panel 3 and the outer panel 2 are secured to each other by the rivet 6, it is possible to suppress the occurrence of hemmed-section-4 displacement and warping. In addition, in the different materials panel structure 1 according to the embodiment, the hollow protruding section 3*a* is formed at a portion of the inner panel 3 to which the rivet 6 is joined, and the heat insulation section 8 that includes the adhesive layer or the adhesive layer and the gap is formed between the inner panel 3 and the outer panel 2. Therefore, welding heat is no longer directly transferred to the outer panel 2. As a result, a softened portion is less likely to be formed on the outer panel 2, so that a bulging portion is not formed in the outer panel 2. Accordingly, it is possible to manufacture an automobile panel having excellent appearance without, for example, making small adjustments.

EXAMPLE

Next, advantages of the present invention are described in detail by way of an example according to the present invention.

Example 1

In Example 1, first, a shaft section of a rivet made of soft steel and having the shape shown in FIG. 6A was driven into an aluminum alloy plate (AA6022, plate thickness=1.22 mm, width=300 mm) by the method shown in FIGS. 8A and 8B, and a head section of the rivet was caulked to form an outer panel.

Then, an adhesive was applied to the outer panel to which the rivet was fastened, and a GA steel plate (plate thickness=0.8 mm, width=300 mm), serving as an inner panel, was superimposed upon the outer panel. Then, hem processing was performed to bend the outer panel and to sandwich the inner panel via a layer of adhesive. Thereafter, a conical protruding section (height=0.8 mm, diameter of the bottom of the cone=2 mm) was formed at a location on the inner panel facing an end of the shaft section of the rivet.

Then, the rivet and the outer panel were sandwiched by a pair of electrodes. With the pressing force being from 5 kN to 300 kN, the current value being from 1 kA to 10 kA, and the energizing time being from 10 milliseconds to 40 milliseconds, while adjusting a nugget melted portion diameter at a steel-plate side to 2 to 3 mm, spot welding was performed. At this time, a heat insulation section of approximately 0.5 mm was formed between the inner panel and the outer panel according to Example 1.

COMPARATIVE EXAMPLES

In Comparative Example 1, a structure, in which an inner panel without a protruding section was sandwiched in a hemmed section of an outer panel via a layer of adhesive, and a rivet, which was the same as that in Example 1, was driven into the outer panel, was prepared.

In Comparative Example 2, a structure, in which an inner panel was joined to an outer panel by using only an adhesive without driving a rivet into the outer panel was prepared.

<Results of Observation of Appearance of Outer Panel at Spot-Welded Portion>

An outer surface of the outer panel after the welding was measured by using a 3D shape measuring instrument (WYCO NT9300, manufactured by VECCO).

As a result, it has been confirmed that, in Example 1 and Comparative Example 2 in which welding was not performed, a bulging portion was not formed in the outer panel, and that the unevenness of a surface of the outer panel at a joint was 15 µm or less and the smoothness of the surface of the outer panel was good.

In contrast, in Comparative Example, 1, a bulging portion was formed in the outer panel (side opposite to the rivet), and the unevenness of the surface of the outer panel was 40 µM.

<Presence/Absence of Hem Displacement>

After hemmed joints (joined members) formed after the hem processing in Example 1 and Comparative Examples 1 and 2 were heated in a test furnace at 170° C. for 20 minutes, and were taken out therefrom, confirmations were made as to whether or not the hemmed sections after the cooling were displaced (that is, whether or not there were any displacements of the hemmed sections before and after the heating).

Although there were no hem displacements in the hemmed joints in Example 1 and Comparative Example 1, the hemmed joints were displaced by approximately 10 mm in Comparative Example 2.

<Joint Strength>

Tensile test pieces were formed by cutting the hemmed joints after the welding in Example 1 and Comparative Example 1 to a width of 30 mm. Then, an end portion of the hemmed section of each outer panel and its corresponding inner panel were chucked, and was pulled in a perpendicular direction (an axial direction) with respect to the shaft of its corresponding rivet to confirm breakage states of the joints.

The results show that the tensile strengths in Example 1 and Comparative Example 1 were both 3 kN. The breakage position was not at a welded metallic portion. Breakage of a base material (plug failure) occurred at a side of the GA steel material. Therefore, it was confirmed that good joint strength was obtained.

REFERENCE SIGNS LIST 1, 101 different materials panel structure
2, 102 outer panel
3, 103 inner panel
3a protruding section (convex section)
4, 104 hemmed section
5 corner
6, 106 rivet
6a head section
6b shaft section
7, 107 melted portion
8 heat insulation section including adhesive layer or adhesive layer and gap
9, 105 adhesive layer (resin layer)
11a, 11b punching jig

The invention claimed is:

1. A panel structure, comprising:
an outer panel that is made of a first metallic material;
an inner panel that is disposed at a lower surface side of the outer panel and that is made of a second metallic material different from the first metallic material and having a melting point that is higher than that of the first metallic material; and
a rivet that is made of the same material as the second metallic material and that includes a head section and a shaft section,
wherein:
the outer panel includes a hemmed section that is formed by bending a peripheral edge portion of the outer panel and that holds the inner panel via an adhesive layer;
with the head section of the rivet remaining on a surface of the outer panel, the shaft section of the rivet penetrates towards the inner panel from a lower surface side of the hemmed section of the outer panel, and an end of the shaft section is spot-welded to the inner panel;
the inner includes a protruding section at a location thereof that faces the rivet, the protruding section extending in an axial direction of the rivet; and
a heat insulation section including the adhesive layer or the adhesive layer and a gap is formed between the outer panel and the protruding section of the inner panel after welding,
wherein a portion of the rivet that contacts the outer panel includes a film having a resistivity that is higher than that of the inner panel.

2. The panel structure according to claim 1, wherein at least one of the head section and the shaft section of the rivet is caulked to the outer panel.

3. The panel structure according to claim 1, wherein the rivet is joined to a corner of the inner panel.

4. The panel structure according to claim 1, wherein the first metallic material is aluminum or an aluminum alloy, and the second metallic material is iron or an iron alloy.

5. The panel structure according to claim 1, wherein the film having a resistivity that is higher than that of the inner panel is made of zinc, lead, or aluminum.

6. The panel structure according to claim 1, wherein the film having a resistivity that is higher than that of the inner panel is made of a synthetic resin.

7. The panel structure according to claim 6, wherein the film having a resistivity that is higher than that of the inner panel is made of a polyester resin or a silicone resin.

8. The panel structure according to claim 1, wherein the film having a resistivity that is higher than that of the inner panel is made of an oxide of iron.

9. The panel structure according to claim 1, wherein the film having a resistivity that is higher than that of the inner panel is made of an electroless Ni—P plated film.

10. The panel structure according to claim 1, wherein the panel structure is a panel structure for an automobile body.

11. The panel structure according to claim 10, wherein the panel structure for an automobile body is a hood, a door, or a trunk.

12. The panel structure according to claim 1, wherein the protruding section has a conical shape.

13. The panel structure according to claim 1, wherein the protruding section has a pyramidal shape.

14. The panel structure according to claim 1, wherein the protruding section has a circular truncated conical shape.

15. The panel structure according to claim 1, wherein the protruding section has a frustum shape.

16. The panel structure according to claim 1, wherein the protruding section has a rectangular column shape.

17. The panel structure according to claim 1, wherein the protruding section has a dome shape.

18. The panel structure according to claim 1, wherein the protruding section has a bead shape.

* * * * *